(12) United States Patent
Leavy

(10) Patent No.: US 6,407,762 B2
(45) Date of Patent: *Jun. 18, 2002

(54) CAMERA-BASED INTERFACE TO A VIRTUAL REALITY APPLICATION

(75) Inventor: Mark Leavy, Beaverton, OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/829,107

(22) Filed: Mar. 31, 1997

(51) Int. Cl.[7] .................................................. G06T 7/00
(52) U.S. Cl. ...................................................... 345/862
(58) Field of Search ........................ 345/419, 433–439, 345/326, 327, 358, 862

(56) References Cited

PUBLICATIONS

Rheingold "Virtual Reality" pp 112–128, 1991.*
D. Harrison & M. Jacques, *Experiments in Virtual Reality*, p. 2 (Butterworth–Heineman, 1996).
J. Segen and S. Pingali, "A Camera–Based System for Tracking People in Real Time," pp. 63–67, 13th International Conference on Pattern Recognition (Aug. 25–29, 1996).
J.L. Crowley et al., "Vision for Man Machine Interaction," *European Computer Vision Network* (1993).
Ashok Samal and Prasana A. Iyengar, "Automatic Recognition and Analysis of Human Faces and Facial Expressions: A Survey," *Pattern Recognition*, vol. 25, No. 1, pp. 65–77, 1992.
R. Foltyniewicz, "Automatic Face Recognition via Wavelets and Mathematical Morphology," pp. 13–17, 13th International Conference on Pattern Recognition (Aug. 25–29, 1996).
G.W. Fitzmaurice et al., "Bricks: Laying the Foundations for Graspable User Interfaces," CHI '95 Proceedings Papers.
Dean Rubine, "Specifying Gestures by Example," Information Technology Center, Carnegie Mellon University, Pittsburgh, PA.

* cited by examiner

Primary Examiner—Almis R. Jankus
(74) Attorney, Agent, or Firm—Blakely, Sokoloff, Taylor & Zafman LLP

(57) ABSTRACT

A method and an apparatus for navigating and manipulating a virtual object in a virtual space using a digital camera as an input device are described. The method comprises the following steps. A plurality of video frames are received and analyzed by a video data analyzer to determine whether a predetermined set of data is present. The predetermined set of data includes several variables. First, whether a person is present in the video frame. Second, if a person is present, then whether the person's head is visible in the video frame. If the person's head is visible, then the position of the person's head in 3-D space is determined and recorded. Finally, the orientation of the person's head in 3-D space is also determined. The third variable is to determine whether a hand or hands are visible. If a hand is visible, the position of the hand in 3-D space is determined and recorded. The orientation of the hand in 3-D space is then determined and recorded. Finally, the state of the hand, whether it is open or closed, is determined and recorded. Information related to these three variables provides most of the information needed by a user to navigate through the virtual space and/or to manipulate a virtual object in the virtual space. The recognition of these three variables is obtained using well-known pattern recognition algorithms.

28 Claims, 7 Drawing Sheets

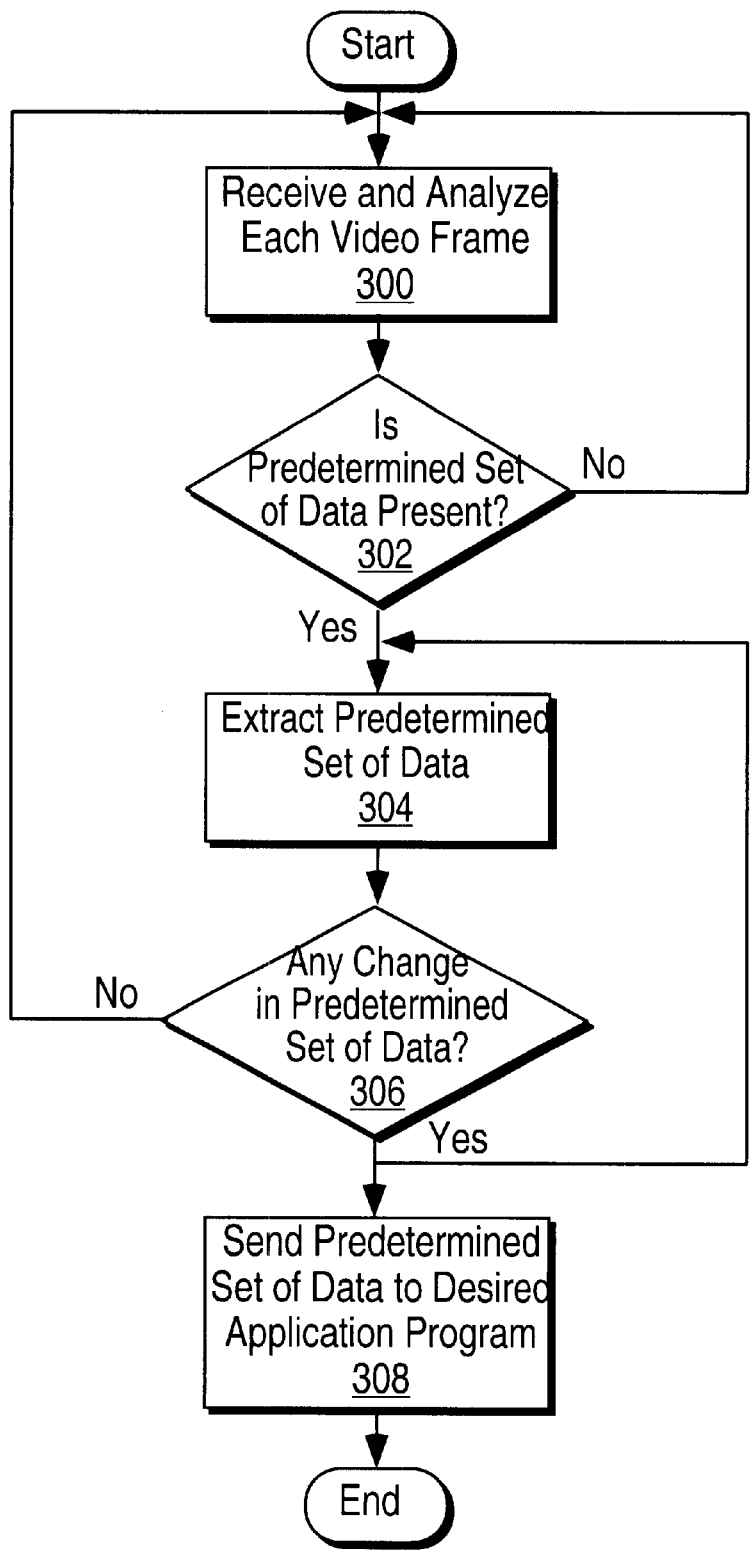

CAMERA-BASED INTERFACE TO A VIRTUAL REALITY APPLICATION

BACKGROUND OF THE INVENTION

1. Field of the Invention

The present invention relates generally to a virtual reality interface. More specifically, the present invention pertains to a method and apparatus for interacting with a virtual reality application.

2. Description of related art

Virtual reality has come to have many different definitions. One useful definition is "virtual reality is the delivery to a human of the most convincing illusion possible that they are in another reality." D. Harrison & M. Jaques, *Experiments in Virtual Reality*, p. 2 (Butterworth-Heinemann, 1996). This virtual reality is located in digital electronic form in the memory of a computer. Thus, virtual reality is another way for humans to interact with a computer, for example, visually and/or by manipulating an object in the virtual space defined by the virtual reality.

Several methods currently exist that allow one to visualize, hear and/or navigate and/ or manipulate objects in a virtual world or space. A virtual reality user has three main experiences in a virtual reality world: manipulation, navigation and immersion. Manipulation is defined as the ability to reach out, touch and move objects in the virtual world. Navigation is defined as the ability to move about and explore the virtual world. Id. at 8. Immersion is about completely enclosing the user so that the user perceives that he/she is actually in the virtual world.

Immersion is usually accomplished with the use of a head-mounted display (HMD) that provides visual signals to the user, as well as audio and tactile signals. HMDs suffer from several disadvantages. First, HMDs are cumbersome to use. Second, the HMD user can become motion sick.

Projected reality is another option to immersion. In projected (virtual) reality, the user sees him/herself projected into the action appearing on the screen. Projected reality uses several methods to interface between the user and the computer. For example, data gloves may be used for immersion as well as for projected reality. When the user wears the data glove, the user's hand movements are communicated to the computer so that the user may, for example, move his/her hand into the graphic representation of a virtual object and manipulate it.

Unfortunately, data gloves suffer from several disadvantages. First, there is often a delay between the user moving the data glove and then seeing the user's virtual hand movement on the display. Secondly, to use the gloves successfully, electromechanical sensors on the data gloves often require constant recalibration. Third, affordable data gloves that accurately translate the user's hand movements into virtual hand movements in the virtual space are not currently available. Finally, data gloves and HMDs may be bothersome for a user to wear and to use.

A mouse is another interface that has been used to interact with a three-dimensional (3-D) display. Clicking on the mouse controls icons or graphical user interfaces that then control the movement of a virtual object. This is illustrated in FIG. 1A in which a prior art World Wide Web browser 100 is shown. A three-dimensional virtual object 103 is displayed on a three-dimensional plane 105. Three graphical user interfaces, 109, 111 and 113 are used to control the movements of the virtual 3-D object 103 and the virtual 3-D circular plane 105. The virtual object 103 and virtual plane 105, however, move as a single unit. The user uses a mouse to click on graphical user interface 109 to move the virtual object 103 and the virtual plane 105 toward the user and/or away from the user. If the user wants to move virtual object 103 and virtual plane 105 up or down, then the user clicks on and moves graphical user interface 111 accordingly. The user clicks onto graphical user interface 113 to rotate the virtual object 103 and the virtual plane 105. The user has difficulty with simultaneously translating and rotating object 103. Moreover, it is difficult for the user to translate the movements of the mouse to control graphical user interfaces 109, 111 and 113. Thus, there is no direct linear correlation between the user's supplied information via the mouse and the resulting motion on the graphical user interfaces 109–111 and 113, and the ultimate movement of virtual object 103 and virtual plane 105.

FIG. 1B illustrates the situation where the user has clicked on to graphical user interface 113 to slightly rotate virtual object 103 and virtual plane. Instead virtual object 103 and virtual plane 105 are over-rotated so that they are partially off the display of the Web Browser 100. Thus, the user has difficulty with accurately predicting and controlling the movement of 3-D virtual objects. In addition, the user has difficulty with simultaneously rotating and moving object 103 up or down, or towards or away from the user. Thus, the user has difficulty with fully controlling any particular virtual object using the currently available input/output devices. Furthermore the user has difficulty with simultaneously combining more than two of the possible six degrees of freedom.

Three translations and three rotations are the six different degrees of freedom in which an object may move. An object may move forward or backward (X axis), up or down (Y axis) and left or right (Z axis). These three movements are collectively known as translations. In addition, objects may rotate about any of these principle axes. These three rotations are called roll (rotation about the X axis), yaw (rotation about the Y axis) and pitch (rotation about the Z axis).

Currently, a keyboard or a mouse are the most commonly available input devices that interact with certain 3-D virtual applications, such as three-dimensional Web browsers. The keyboard and mouse usually allow only horizontal and vertical movements. A keyboard and a mouse do not allow a user to navigate through a three-dimensional virtual space utilizing the six degrees of freedom. In addition, a keyboard and a mouse do not allow accurate manipulation of a virtual object. Thus, no input/output device exists for accurately mapping a user's six degrees of freedom of movement into a 3-D virtual reality application.

Therefore, it is desirable to have an affordable non-invasive interface between a user and a virtual space that allows the user to manipulate objects and to navigate through the virtual space with six degrees of freedom in a nonsequential manner.

SUMMARY

A computer-implemented method for operating in a virtual space is described. The method comprises the following steps. A visual detection device is used to determine whether a predetermined set of data signals exist in user movement data signals. It is determined if the predetermined set of data signals has changed. The changed predetermined set of data signals is provided to a virtual reality application program that is generating the virtual space. The predetermined set of data signals is used by the virtual reality application program to perform an action in the virtual space.

BRIEF DESCRIPTION OF THE DRAWINGS

The present invention is illustrated by way of example and not a limitation in the figures of the accompanying drawings in which like references indicate similar elements.

FIG. 3 illustrates a flowchart utilizing an embodiment of the present invention.

DETAILED DESCRIPTION

A method and an apparatus for interacting with a virtual reality application are described. In the following description, for the purposes of explanation, numerous specific details are set forth in order to provide a thorough understanding of the present invention. It will be apparent, however, to one skilled in the art that the present invention may be practiced without these specific details. In other instances, well-known structures, processes and devices are shown in block diagram form in order to avoid unnecessarily obscuring the present invention.

An embodiment of the present invention may use a digital camera as an input device. The input signals received from the digital camera is analyzed, and the analysis' results are then used to interact directly with a virtual reality application program on a computer system.

Figure 1A:
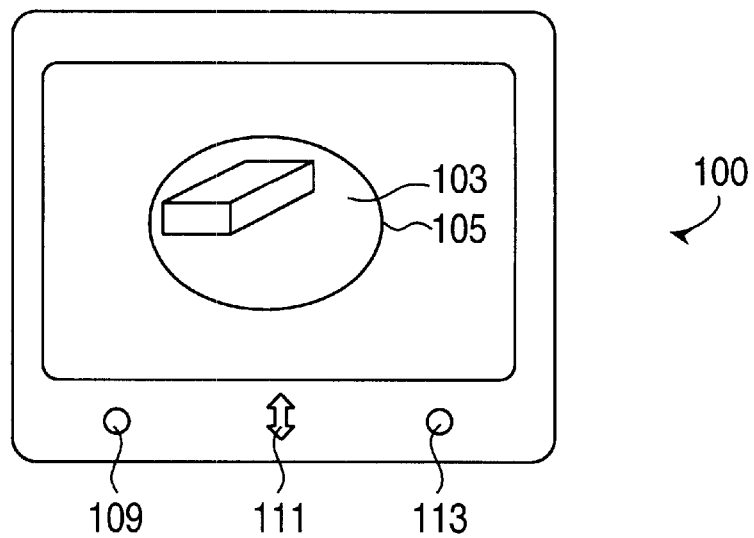
FIG. 1A illustrates a prior art Web browser.
Figure 1B:
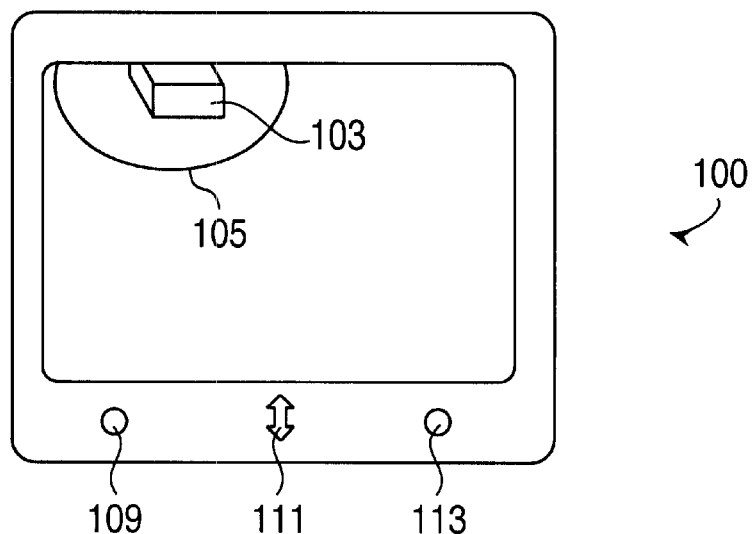
FIG. 1B illustrates the prior art- Web browser of FIG. 1A after a virtual object has been rotated.

Embodiments in accordance with the present invention provide several advantages over the prior art. First, use of the digital camera provides greater accuracy in projecting the user's actual movement into virtual movement within a virtual space generated by the virtual reality application. For example, if a user wants to move a virtual object displayed in the virtual space, the user moves his/her hand in the camera's view so that the user's movements are recognized and used to manipulate the virtual object. Second, the use of the digital camera allows the user to use all six degrees of freedom in manipulating a virtual object or in navigating through the virtual space. The user is freed from the limitations presented by a mouse or a keyboard. As a result, unlike the prior are Web browser of FIG. 1A, a user may simultaneously rotate and move the virtual object 103 toward the user or any other possible combination of movements. Third, an inexpensive digital camera that is often bundled with the computer system may be used. Fourth, there is no longer the use of an intrusive and uncomfortable interface, such as a head mounted display or a data glove, between the user and the virtual reality application. Instead, the digital camera is a non-invasive input device that does not create any of the problems associated with, for example, a head mounted display, such as motion sickness.

Figure 2:
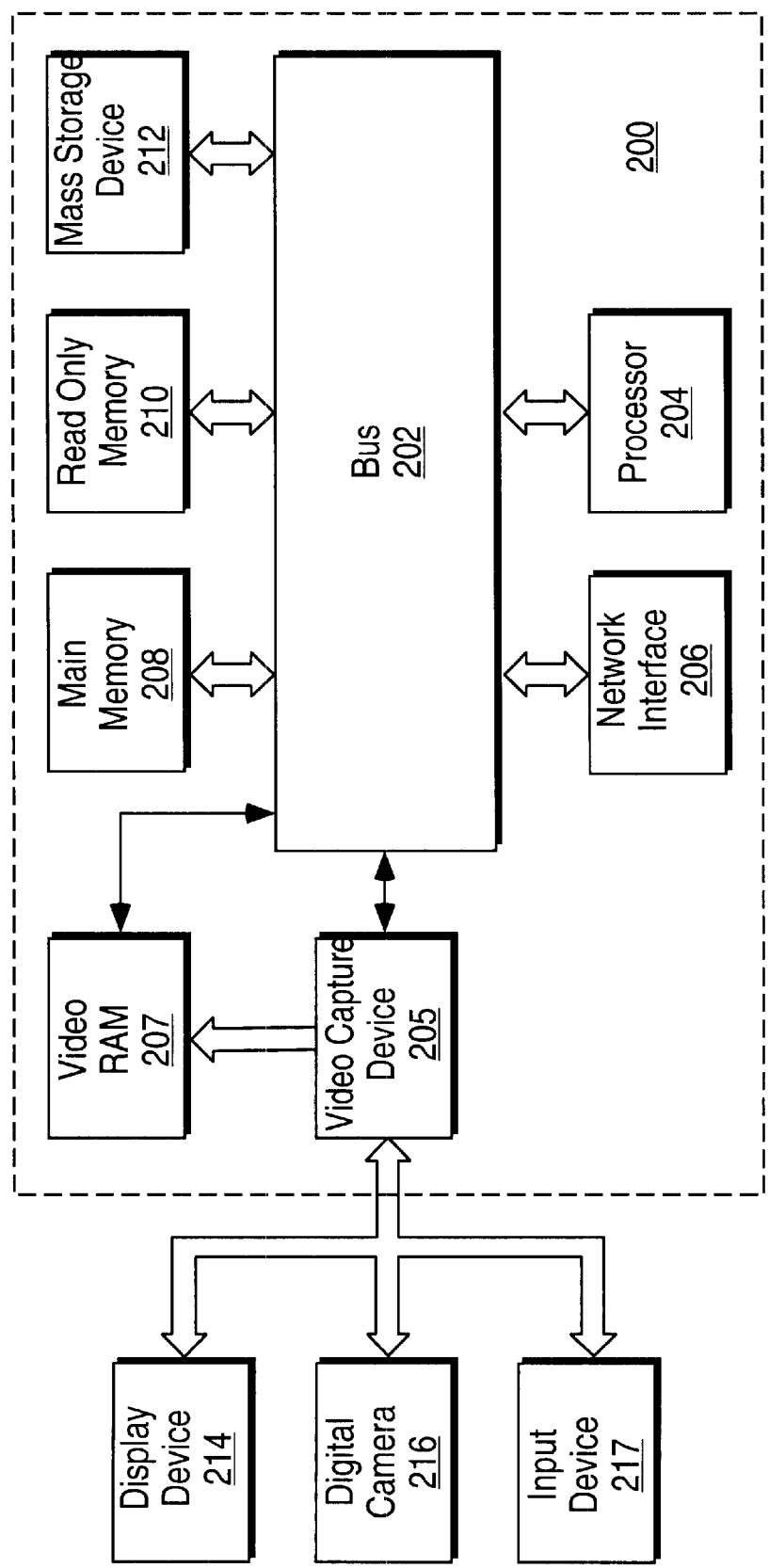
FIG. 2 illustrates an embodiment of a computer system in which the present invention may be implemented.

FIG. 2 illustrates an embodiment of a computer system in which the present invention operates. Computer system 200, which is illustrated in FIG. 2, comprises a bus 202 for communicating information, and a processor 204 coupled with bus 202 for processing information. A main memory 208 is coupled with bus 202 for storing information and instructions for the processor 204. A display device 214 is coupled to bus 202 for displaying information for a computer user. An input device 217, such as mouse or keyboard, may be coupled to the bus 202 for communicating signal information and command selections to the processor 204 and a mass storage device 212.

A digital camera 216 that operates like an input device is advantageously included and coupled to the bus 202 for facilitating communication of signal information and command selections to the processor 202. See, e.g., J. Segen and S. Pingali, "A Camera-Based System For Tracking People in Real Time," pp. 63–67, 13th International Conference on Pattern Recognition (Aug. 25—29, 1996). In one embodiment, a COMPAQ™ digital camera is used that is manufactured by COMPAQ™ Corporation of Houston, Tex. A video capture device 205 receives video data signals from digital camera 216 and then transmits the video data signals to video RAM (random access memory) 207. VRAM 207 transmits the video data signals to display device 214 and to bus 202, which then transmits the video data signals to main memory 208.

Processor 204 may be any of a wide variety of general purpose processors or microprocessors, such as the Pentium™ microprocessor manufactured by Intel™ Corporation of Santa Clara, Calif. It will be apparent to those of ordinary skill in the art, however, that other types of processors may also be used. Display device 214 may be a liquid crystal cell device, a cathode ray tube (CRT) or any other suitable display device. A mass storage device 212, such as a magnetic disk and associated disk drive, is also coupled to the bus 202 for storing information and instructions in this embodiment. Mass storage device 212 may be a conventional hard disk drive, a floppy disk drive, a CD-ROM drive, or other magnetic or optical data storage device for reading and writing information stored on a hard disk, a floppy disk, a CD-ROM, a magnetic disk, or other magnetic or optical data storage medium.

Figure 2A:
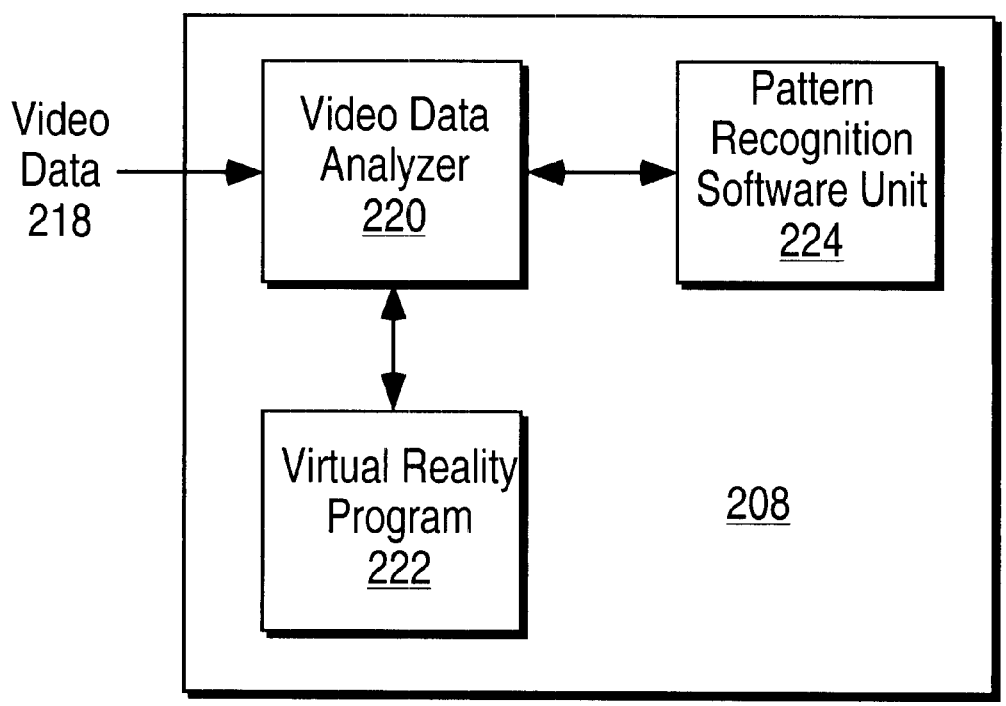
FIG. 2A illustrates the components of main memory for one embodiment of FIG. 2.

Referring to FIG. 2A, main memory, in one embodiment, comprises a video data analyzer 220, a virtual reality program 222 and pattern recognition software, 224, which is well-known in the art. See, e.g., J. L. Crowley et al., "Vision for Man Machine Interaction," *European Computer, Vision Network* (1993). Video data analyzer 220 receives video data signals 218 from VRAM 207 via bus 202. Video data analyzer 220 analyzes the incoming video data signals to determine whether a predetermined set of data signals is present. If it is present, then video data analyzer 220 transmits the predetermined set of data signals to virtual reality program 222. Moreover, video data analyzer 220 determines if there are any changes in the predetermined set of data signals and transmits any changes to virtual reality program 222. In addition, video data analyzer 220 also transmits video data signals 218 to pattern recognition software unit 224.

Although the present invention has been described above utilizing a single computer system, it will be apparent to one of skill in the art that embodiments of the present invention may also be implemented on more than one computer system. For example, a first computer system could receive input signals from the digital camera, analyze the input signals and then extract the relevant information, such as a predetermined set of data signals. The relevant information signals is then output from the first computer system and fed as input signals into a second computer system, which contains the virtual reality application.

Referring to FIG. 3, a flow chart of one embodiment of the present invention is illustrated. In step 300, the video data analyzer 220 receives input signals from the digital camera and then analyzes each of the video frames. A digital camera typically produces about 30 frames per second. In particular, in step 302, the video data analyzer 220 analyzes the video frames to determine if a predetermined set of data signals is present. The predetermined set of data signals may be specified by the user or preselected by software. The analysis of whether a predetermined set of data signals is present is made by well-known pattern recognition algorithms. If the predetermined set of data signals is present then the predetermined set of data signals is extracted in step 304. This extraction process helps reduce overloading the virtual reality application program 222 with redundant or useless data signals.

In step 306, the video data analyzer 220 is sampling the video frames to determine if there is any change in the predetermined set of data signals from a set of initial values for the predetermined set of data signals. For example, if the predetermined set of data signals initially stated that a person is present in a video frame, a change could mean that the person is no longer in the video frame, or that the person's position in the video frame has changed. If there is any change in the predetermined set of data, the computer will return to step 304 and extract the modified predetermined set of data signals. In step 308, the predetermined set of data signals ( which is defined to include an initial value and any changes to the initial value) is sent to the desired application, such as a virtual reality application program. During this process, the video data analyzer 220 continues to receive and analyze each of the video frames captured by the digital camera.

Figure 4A:
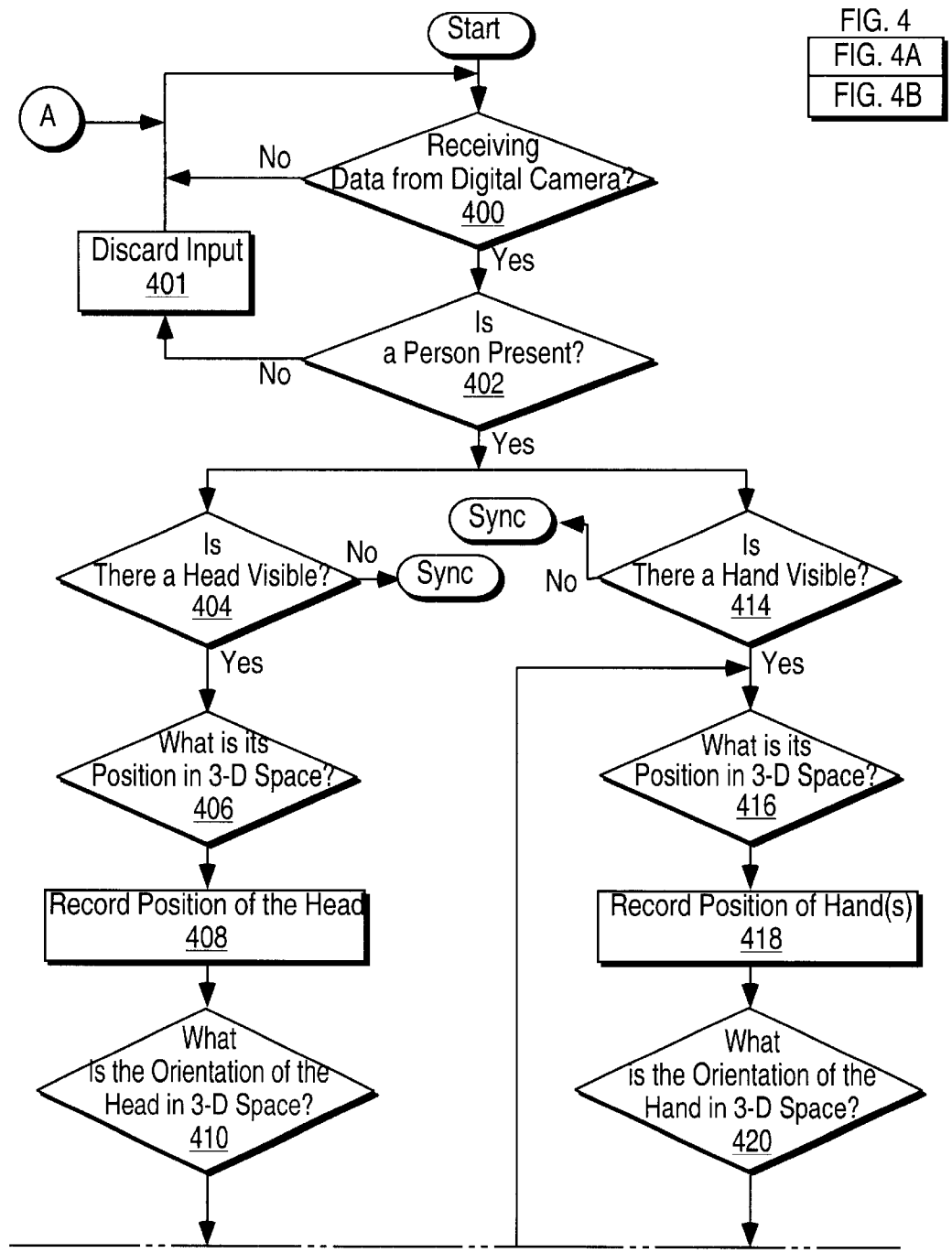
FIG. 4A illustrates another embodiment of the present invention in part of a flowchart.
Figure 4B:
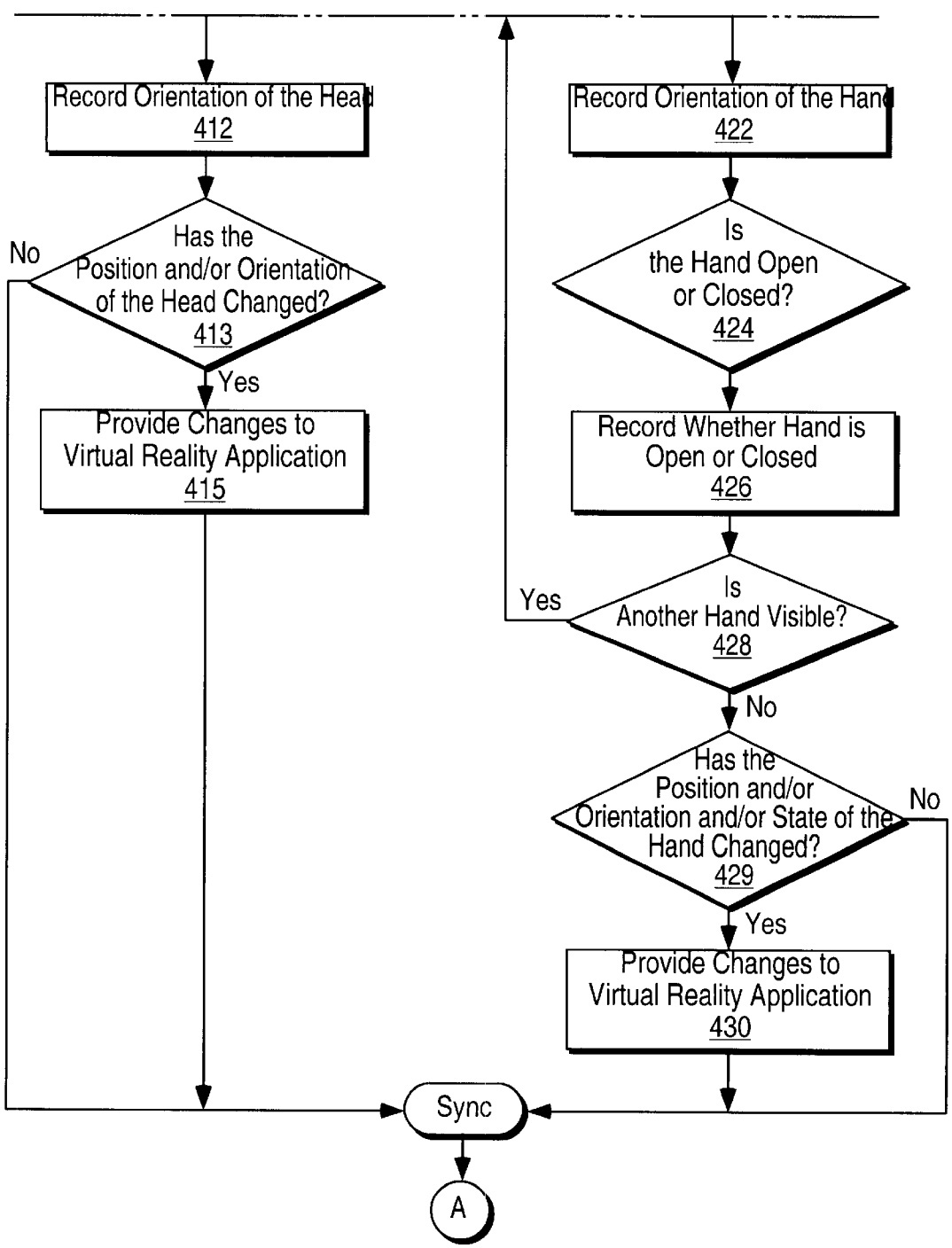
FIG. 4B is a continuation of the flowchart in FIG. 4A.

FIGS. 4A–B illustrate a flow chart for the extraction of the predetermined set of data signals by video data analyzer 220, in one embodiment of the present invention. Referring to FIG. 4A, in decision diamond 400, the digital camera may be receiving input signals. If the digital camera is receiving data signals, then the next step is decision diamond 402. The first variable of the predetermined set of data signals is whether a person is present in a video frame as shown in decision diamond 402. The recognition of a person by a computer system using pattern recognition software is well-known in the art. See e.g., Ashok Samal and Prasana A. Iyengar, "Automatic Recognition and Analysis o5f Human Faces and Facial Expressions: A Survey," *Pattern Recognition,* Vol. 25, No. 1, pp. 65–77, 1992. If a person is not present, then the video data input signals is discarded in step 401 and step 400 are repeated. If a person is present, then the video data analyzer 220 may choose to go along two different paths in parallel (as shown) or asynchronously (not shown). Since both paths cannot be discussed simultaneously, the path on the flow chart (i.e., beginning with step 404) will be discussed first.

In step 404, using conventional pattern recognition techniques, the video data analyzer 220 determines if there is a head visible in the video frame. See, e.g., R. Foltyniewicz, "Automatic Face Recognition via Wavelets and Mathematical Morphology," pp. 13–17, 13th International Conference on Pattern Recognition (Aug. 25–29, 1996). If the answer is no, then the next step is synchronization ("Sync") with the pathway that begins with step 414. But if the answer is yes, then in step 406, the position of the head in 3-D space is determined. In step 408, the position of the head is recorded so that it may be used to map its position to a corresponding position within the virtual reality application. In step 410, the orientation of the head in three-dimensional space is recorded. For example, the orientation describes whether the front of the head is facing the camera or whether the head is turned to one side. The orientation of the head in three-dimensional space may reflect the perspective seen by the user and thus, the perspective shown on the display. Referring to FIG. 4B, in step 412, the orientation of the head is recorded.

Since the person in front of the digital camera may navigate through the virtual space shown on the display, the person may move around, which means the person's head may also move. As a result, in step 413, whether the position and/or orientation of the head has changed is (are) determined. If the position of the person's head is changed, then the new position of the head is provided to the virtual reality application in step 415. In addition, if the orientation of the head has changed, then that new orientation is also provided to the virtual reality application in step 415. The next step is synchronization.

In step 414 of FIG. 4A, whether a hand is visible is determined using well-known pattern recognition algorithms. If no hand is visible in a video frame, then the next step is synchronization. But if a hand is visible, in step 416, the position of the hand (or hands) in 3-D space is determined. The position of the hand is recorded in step 418. The position of the hand is then correlated (or mapped) to a position for the hand in the virtual space generated by the virtual reality application. In step 420, the orientation of the hand in 3-D space is determined. The orientation of the hand is recorded in step 422 of FIG. 4B. The next step is to determine whether the hand is opened or closed (i.e., the state of the hand) in step 424. If the hand appears more planar than spherical, then the hand is determined to be open. If the shape of the hand is determined to be more spherical than planar, then the hand is determined to be closed. But if the hand is between open and closed then a "maximum likelihood" estimation is made to choose the closest state in this particular embodiment. All of this may be determined by using pattern recognition software that is well-known in the art although the invention is not limited in scope in this respect.

If the hand is open, then the hand is available to grasp or manipulate a virtual object created by the virtual reality application. Unlike the prior art, there is not an additional barrier or interface between the virtual object and the user's projected ability to manipulate the virtual object. See, e.g., G. W. Fitzmaurice et al., "Bricks: Laying the Foundations for Graspable User Interfaces," CHI '95 Proceedings Papers. In step 426, the state of the hand, whether it is opened or closed, is recorded. In step 428, whether another hand is visible is determined. If another hand is visible, then steps 416 through 428 are repeated. But if another hand is not visible, then the next question is whether the position and/or orientation and/or state of the hand has changed in step 429. If there are any changes, for example, if the position of the hand (whether it is the first hand noted or the second hand observed) has changed, then the changes are provided to the virtual reality application program in step 430.

The video data analyzer 220 is constantly updating the angle of a hand and the vectors describing the hand each time the hand moves. This is desirable because this embodiment the present invention allows a hand to move non-sequentially with six degrees of freedom of movement in the virtual space. A projection of the hand may move into the virtual reality application, unhindered by previous input devices, such as a mouse or a keyboard. It will be appreciated that an embodiment of the present invention may be used to sequentially recognize and process one hand's movements at a time or it may recognize and process almost simultaneously the movements of more than one hand.

Figure 5:
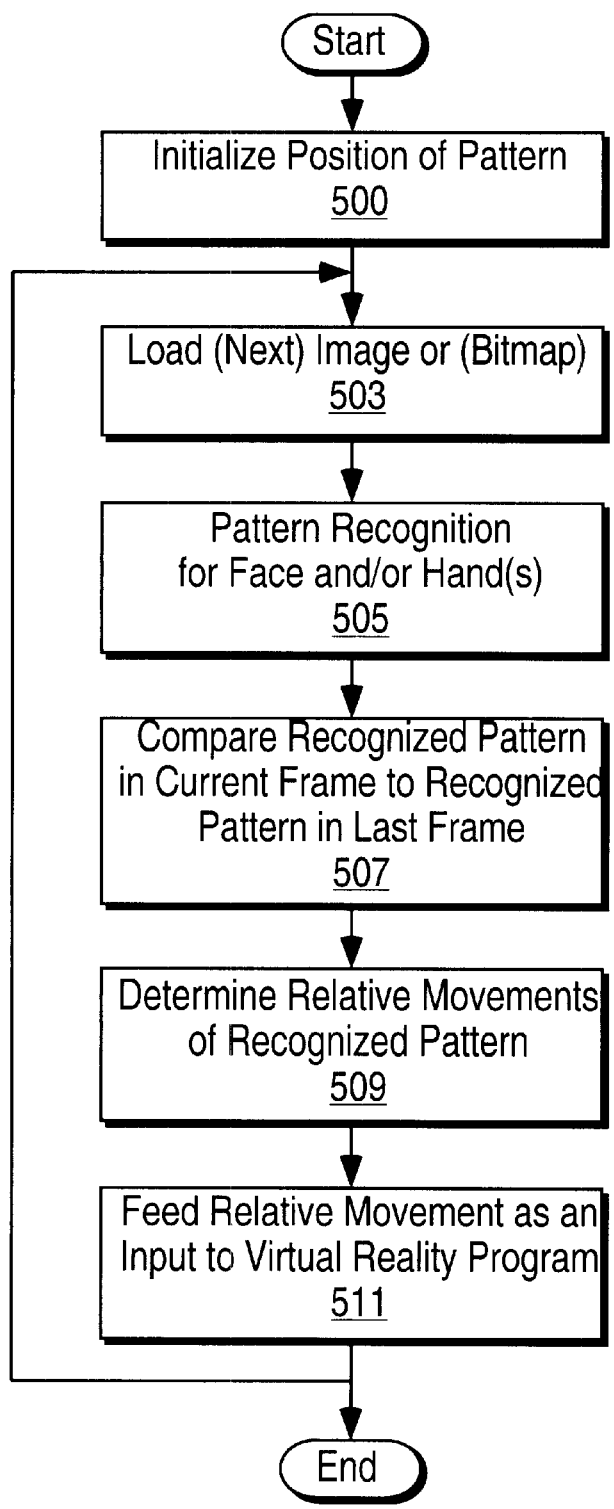
FIG. 5 is a flow chart illustrating yet another embodiment of the present invention.

FIG. 5 illustrates a flow chart for one embodiment of a pattern recognition algorithm that may be used in the present invention. In step 500, the computer initializes the position of a pattern or a template using conventional pattern recognition algorithms. This pattern may be for a person, a head and/or a hand or hands. The extraction of a predetermined set of data signals that includes information about these three variables—a person's presence, head and hand(s)— provides most of the information needed for a person to interact with a virtual reality application program. For example, the digital camera may provide a video frame in which a head is located at a (X, Y, Z) position. In step 503, that image (or a bitmap of that image) of the head is loaded into the computer's memory. In step 505, pattern recognition for a face and/or hands may be implemented, in one embodiment, to identify the received image.

In step 507, if there was a previous frame with an identifiable pattern, then the recognized pattern in the previous frame is compared to the current frame. This is to determine if there are any changes in the video frame. In step 509, it is determined if there is any relative movement of the recognized pattern. For example, has the person's head and/or hands moved since the previous video frame. If any change is detected in the predetermined set of data signals (e.g., hand moved), then a modified set of data signals is created. This modified set of data signals may be used to perform an action, such as manipulate a first or a second virtual object. The second virtual object may be the first virtual object in a different position, or an entirely different object than the first virtual object. In step 511, the relative movement of the-person's head and/or hands is then fed as input signals to a virtual reality application program. It is to be appreciated that this virtual reality application may be a 3-D Web page or 3-D Web Browser although the invention is not limited in scope in this respect. Steps 503–511 may be repeated as a continuous loop while the video data analyzer is receiving and processing images from the digital camera.

It will be apparent to one of skill in the art that one embodiment of the present invention may be used to record the actions of more thank one person or any other living subject. Thus, one embodiment of the present invention may be used to record the movements of a group of people, who may then concurrently interact with a virtual reality application, such as a virtual game. For example, if the game involved the participants raising their hands every time someone knew the answer to a question, the digital camera records the first person who raises his or her hand in response to the question. In other words, unlike prior art systems, more than one individual may interact with a virtual reality program using an embodiment of the present invention. A group of individuals, within the digital camera's view, may interact as a group with a virtual reality program. Thus, embodiments of the present invention may make the use of virtual reality programs less of a solitary experience.

It will also be appreciated that the present invention can be used to track and record variables other than the ones described.

The foregoing description provides an example of a method and an apparatus for using a digital camera as an input device for a computer system running a virtual reality application. The use of a digital camera as an input device is meant to be illustrative and not limiting. It will be appreciated that numerous modifications may be made in practicing the present invention without departing from the spirit and scope of the invention, which is defined by the following claims.

We claim:

1. A computer-implemented method comprising:
    receiving a current video frame from a visual detection device;
    determining that a predetermined set of data signals exists in the current video frame, said predetermined set of data signals including information concerning presence of a person in the current video frame, head of the person, and hands of the person;
    comparing the predetermined set of data signals from the current video frame with a predetermined set of data signals from a prior video frame to identify a change in the predetermined set of data signals;
    providing the change in the predetermined set of data signals to a virtual reality application program that is generating the virtual space; and
    using the change in the predetermined set of data signals by the virtual reality application program to perform an action in the virtual space.

2. The computer-implemented method of claim 1, wherein the action is manipulating a first virtual object displayed on a display device of the computer system.

3. The method of claim 2, further including:
    using the change in the predetermined set of data signals to manipulate a second virtual object displayed on the display device of the computer system.

4. The method of claim 3, wherein the first virtual object is manipulated through six degrees of freedom.

5. The method of claim 3, wherein the second virtual object is manipulated through six degrees of freedom.

6. The method of claim 5, wherein the first virtual object and the second virtual object are different virtual objects.

7. The method of claim 5, wherein the first virtual object and the second virtual object are the same virtual object, wherein the second virtual object is a modified first virtual object.

8. The computer-implemented method of claim 1, wherein the action is navigating through the virtual space.

9. The computer-implemented method of claim 1, wherein the predetermined set of data signals indicates whether the person is detected by the visual detection device.

10. The computer-implemented method of claim 1, wherein if the head of the person is present, the predetermined set of data further includes a position of the head and an orientation of the head in three-dimensional space.

11. The computer-implemented method of claim 1, wherein if the hand is present, the predetermined set of data signals further indicates a position of the hand and an orientation of the hand in three-dimensional space, and whether the hand is open or closed.

12. The computer-implemented method of claim 1, wherein the determining that the predetermined set of data signals exists includes determining that the hand is open if the hand is shaped more like a plane than a sphere.

13. The computer-implemented method of claim 1, wherein the determining that the predetermined set of data signals exists includes determining that the hand is open if the hand is shaped more like a sphere than a flat plane. /

14. The computer-implemented method of claim 1, wherein the visual detection device comprises a digital camera.

15. The computer-implemented method of claim 1, further including:
    mapping the predetermined set of data signals to the virtual space created by the virtual reality application on a computer system.

16. The method of claim 1, further including:
using the change in the predetermined set of data signals to interact with the virtual object.

17. The computer-implemented method of claim 1 wherein the predetermined set of data signals is specified by the user.

18. A computer system comprising:
a first bus;
a memory coupled to the first bus and a processor, wherein the memory includes a virtual reality application and a video analyzer;
a network interface coupled to the first bus;
a video capture device coupled to the first bus; and
a digital camera coupled to the video data capture device, the digital camera to produce input signals to the video analyzer, the video analyzer to determine that a current video frame includes a predetermined set of data signals, said predetermined set of data signals including information concerning presence of a person in the current video frame, head of the person, and hands of the person, to compare the predetermined set of data signals from the current video frame with a predetermined set of data signals from a prior video frame, to identify a change in the predetermined set of data signals, and to provide the change in the predetermined set of data signals to a virtual reality application, the virtual reality applications using the change in the predetermined set of data signals by the virtual reality application program to perform an action in a virtual space.

19. The computer system of claim 18, wherein the input signals from the digital camera are used by the virtual reality application to manipulate a virtual object in the virtual space.

20. The computer system of claim 18, wherein the input signals from the digital camera are used by the virtual reality application to navigate through the virtual space.

21. The computer system of claim 18, wherein the video data analyzer is to navigate through the virtual space in six degrees of freedom using the change in the predetermined set of data signals.

22. The computer system of claim 18, wherein the video data analyzer is to manipulate a virtual object in the virtual space in six degrees of freedom using the change in the predetermined set of data signals.

23. The computer system of claim 18 wherein the predetermined set of data signals is specified by the user.

24. A computer readable medium that provides instructions, which when executed on a processor, cause said processor to perform operations comprising:
receiving a current video frame from a visual detection device;
determining that a predetermined set of data signals exists in a current video frame, the predetermined set of data signals including information concerning presence of a person in the current video frame, head of the person, and hands of the person;
comparing the predetermined set of data signals from the current video frame with a predetermined set of data signals from a prior video frame to identify a change in the predetermined set of data signals;
providing the change in the predetermined set of data signals to a virtual reality application program that is generating the virtual space; and
using the change in the predetermined set of data signals by the virtual reality application program to perform an action in the virtual space.

25. The computer readable medium of claim 24, wherein the action is manipulating a first virtual object displayed on a display device of a computer system.

26. The computer readable medium of claim 24, wherein the action is navigating through the virtual space.

27. The computer readable medium of claim 24, wherein the visual detection device comprises a digital camera.

28. The computer readable medium of claim 24, wherein the predetermined set of data signals is specified by the user.

* * * * *

UNITED STATES PATENT AND TRADEMARK OFFICE
CERTIFICATE OF CORRECTION

PATENT NO. : 6,407,762 B2
DATED : June 18, 2002
INVENTOR(S) : Leavy

It is certified that error appears in the above-identified patent and that said Letters Patent is hereby corrected as shown below:

<u>Column 3,</u>
Line 7, delete "prior art-" and insert -- prior art --.
Line 52, delete "prior are" and insert -- prior art --.

<u>Column 5,</u>
Line 43, delete "o5f" and insert -- of --.
Line 46, delete "signals is discarded" and insert -- signals are discarded --.

<u>Column 7,</u>
Line 34, delete "Browser although" and insert -- Browser, although --.

Signed and Sealed this

Twenty-eighth Day of January, 2003

JAMES E. ROGAN
*Director of the United States Patent and Trademark Office*